(12) United States Patent
Robison et al.

(10) Patent No.: US 11,496,518 B2
(45) Date of Patent: Nov. 8, 2022

(54) SYSTEM AND METHOD FOR DISTRIBUTED NETWORK ACCESS CONTROL

(71) Applicant: DELL PRODUCTS L.P., Round Rock, TX (US)

(72) Inventors: Charles D. Robison, Buford, GA (US); Nicholas D. Grobelny, Austin, TX (US); Jason Kolodziej, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 435 days.

(21) Appl. No.: 16/530,356

(22) Filed: Aug. 2, 2019

(65) Prior Publication Data

US 2021/0037060 A1 Feb. 4, 2021

(51) Int. Cl.
*H04L 29/06* (2006.01)
*H04L 9/40* (2022.01)
*H04L 9/30* (2006.01)
*H04L 9/32* (2006.01)

(52) U.S. Cl.
CPC ............... *H04L 63/20* (2013.01); *H04L 9/30* (2013.01); *H04L 9/3234* (2013.01); *H04L 63/0876* (2013.01)

(58) Field of Classification Search
CPC ......... H04L 63/20; H04L 9/30; H04L 9/3234; H04L 63/0876; H04L 63/123; H04L 9/3297; H04L 9/0877; H04L 9/0897; H04L 2209/38; H04L 9/3239
USPC ....................................................... 713/155
See application file for complete search history.

(56) References Cited

U.S. PATENT DOCUMENTS

2019/0097807 A1 3/2019 Mahanta et al.
2019/0312855 A1* 10/2019 Sharma ............... G06F 16/1834
2019/0334717 A1* 10/2019 Lelcuk .................. H04L 9/3271
(Continued)

OTHER PUBLICATIONS

Ercim News, "Distributed Access Control Through Blockchain Technology", Printed from Internet Jul. 8, 2019, 4 pgs.
(Continued)

*Primary Examiner* — Jeffrey C Pwu
*Assistant Examiner* — Nega Woldemariam
(74) *Attorney, Agent, or Firm* — Egan, Enders & Huston LLP.

(57) ABSTRACT

Various embodiments of network access control (NAC) systems and methods are provided herein to control access to a network comprising a plurality of network endpoint nodes, where each network endpoint node includes a policy information point and a policy decision point. The policy information point within each network endpoint node stores a distributed ledger including one or more client policies that must be satisfied to access the network, and a smart contract including a set of predefined rules defining network access behaviors and actions. Upon receiving a network access request from a client device outside of the network, the policy decision point within each network endpoint node executes the smart contract to determine whether the client device should be granted access, denied access or have restricted access to the network, and executes consensus algorithm to select one of the network endpoint nodes to be a policy decision point leader.

20 Claims, 7 Drawing Sheets

(56) References Cited

U.S. PATENT DOCUMENTS

2020/0349194 A1* 11/2020 Kundu ................. G06F 16/903

OTHER PUBLICATIONS

Wikipedia, "Distributed ledger", Printed from Internet Jul. 8, 2019, 2 pgs.
Sawtooth, Introduction, Sawtooth v1.05 documentation, Printed from Internet Jul. 3, 2019, 7 pgs.
Tomlinson, "Introduction to the TPM", Chapter 7, Information Security Group, 2008, 18 pgs.
Hanna, Enterprise Systems, "Preventing NAC Attacks", Nov. 27, 2007, 6 pgs.
Arun et al., "The Blockchain Technology Landscape", Informit, Mar. 25, 2019, 18 pgs.
Wikipedia, "Trusted Platform Module", Printed from Internet Jul. 8, 2019, 6 pgs.
Infosec Institute, "UEFI and the TPM: Building a foundation for platform trust", Printed from Internet Jul. 8, 2019, 25 pgs.
Sitoh, Coinmonks, "What are the differences between Ethereum, Hyperledger Fabric and Hyperledger Sawtooth", Dec. 4, 2018, 8 pgs.

* cited by examiner

SYSTEM AND METHOD FOR DISTRIBUTED NETWORK ACCESS CONTROL

FIELD

This invention relates generally to network access control methods, and more particularly, to systems and methods for distributed network access control.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network access control (NAC) is a computer networking solution that uses a set of protocols to define and implement a policy that describes how to secure access to network nodes when client devices and/or users attempt to access the network nodes. In other words, network access control aims to do exactly what the name implies—control access to a network with policies, including authentication (i.e., pre-admission) controls and authorization (i.e., post-admission) controls dictating which client devices and/or users can access a network, where they go on a network and what they can do. A NAC system can deny network access to non-compliant devices and/or unauthorized users, place noncompliant devices in a quarantined area or give them only restricted access to certain computing resources, thus keeping insecure nodes from infecting the network.

FIG. 1 (PRIOR ART) illustrates a centralized NAC system in which a primary policy information point is used to gather information about client devices connected to or attempting to access a Local Area Network (e.g., an internal LAN), a primary policy decision point is used to compare the information gathered from the client devices to one or more policies or predefined behaviors, and a primary policy enforcement point is used to take action (e.g., grant/deny network access to the client device, restrict access to certain computing resources, etc.) based on the decision made by the policy decision point. As shown in FIG. 1, a client device requesting network access or computing resources may be an internal device (e.g., Client A or Client C) operating within an internal firewall, or an external device (e.g., Client B) operating outside of an external firewall and attempting to access the internal LAN via a Wide Area Network (WAN), such as the Internet.

For example, Client A (located within the internal firewall) may send a request to the Policy Decision Point (via path 5) to connect to the internal LAN and/or to use computing resources of the internal LAN, such as computing resources of Server A. Upon receiving such request, the primary policy decision point obtains Client A's policy from the primary policy information point (via path 2) and determines whether network access should be granted, denied and/or restricted. If Client A meets the policy requirements necessary to access Server A, the primary policy decision point sends a response to Client A (via path 6) granting Client A access to Server A (via path 7). If Client A does not meet the policy requirements, the primary policy decision point sends a response to Client A (via path 6) denying access to Client A.

In another example, Client B sends a request to the primary policy enforcement point to connect to the internal LAN and/or to use computing resources of the internal LAN. Since Client B is outside the external firewall, Client B may send user authentication information to the primary policy enforcement point to verify the identity of the user operating Client B before or after sending the network access request. The primary policy enforcement point forwards the network access request received from Client B to the primary policy decision point (via path 1), which obtains Client B's policy from the primary policy information point (via path 2) and determines whether network access should be granted, denied and/or restricted. If Client B provides the correct user authentication and meets the policy requirements necessary to access the internal LAN, the primary policy enforcement point sends an acceptance response to Client B granting access to the internal LAN and/or one or more computing resources of the internal LAN.

Centralized NAC systems have strategic points of failure, which (a) necessitate server redundancy to improve fault tolerance and (b) can be exploited by hackers or malicious code to gain unauthorized access to the network. As shown in FIG. 1, for example, a backup policy decision point and/or a backup policy information point are often included within centralized NAC systems to improve fault tolerance. The backup policy decision and policy information points run continuously in the background, but are not accessed until the primary policy decision point and/or the primary policy information point fail or go offline. When the primary policy decision point is down, the backup policy decision point can be used (via path 3) to determine, for example, if Client A should be granted access to Server A, or if Client B should be granted access to the internal LAN. Likewise, when the primary policy information point is down, the backup policy information point may provide the primary policy decision point (via path 4) or the backup policy decision point (via path 8) the policy information needed to determine if Client A or Client B should be granted access. While fault tolerance is improved, providing backup policy decision and policy information points and constantly running such backup points in the background is costly. Moreover, authenticated and authorized client devices may not be granted network access if the primary policy information point fails and the backup policy information point is incorrect or corrupt.

In some cases, targeted cyber-attacks on the integrity of policy information and policy decision points in centralized network access control systems can lead to unprivileged access to the network or denial of service for other network resources. For example, if the primary policy decision point and/or the primary policy information point is tampered with, but not corrupt, the backup policy decision point and/or the backup policy information point may not be used, which may cause the primary policy decision point to grant network access to a client device when access should not have been granted. In another example, if a client device (e.g., Client B) contains an underlying architecture policy (e.g., a BIOS policy) that is misconfigured by malware or unauthorized user change, the primary/backup policy decision point may grant network access to the client device without taking into account that the client device has a non-compliant underlying architecture and should not have access to the internal LAN.

SUMMARY OF THE INVENTION

The following description of various embodiments of network access control systems and related methods is not to be construed in any way as limiting the subject matter of the appended claims.

In the present disclosure, various embodiments of network access control (NAC) systems and methods are provided herein to control access to a network comprising a plurality of network endpoint nodes, where each network endpoint node includes a policy information point and a policy decision point. In other words, the embodiments of NAC systems and methods described herein distribute policy information points and policy decision points across all network endpoint nodes, and therefore, improve fault tolerance, mitigate cyber-attacks and reduce total cost of ownership compared to conventional centralized NAC systems and methods that rely on a primary/backup policy information point and a primary/backup policy decision point. Additional advantages and improvements provided by the NAC systems and methods described herein will become apparent upon reading this disclosure.

According to one embodiment, a NAC method disclosed herein may generally include receiving a network access request from a client device to access a network, or a network resource within the network. Upon receiving the network access request from the client device, the method may include executing a smart contract to determine if the client device should be granted access to the network or the network resource, where the smart contract includes a set of predefined rules defining network access behaviors and actions, and may additionally include executing a consensus algorithm to select one of the network endpoint nodes to be a policy decision point leader.

In some embodiments, the method may generate and send an acceptance response to the client device granting access to the network or the network resource if the client device contains a client policy that satisfies one or more of the predefined rules of the smart contract. If the client device contains a client policy that does not satisfy the one or more predefined rules of the smart contract, the method may generate and send a denial response to the client device denying access to the network or the network resource. In some embodiments, the method may further include updating a network access log to include a log of the network access request received from the client device and the acceptance response (or a denial response) sent to the client device by the policy decision point leader.

In the embodiments described herein, said receiving a network access request, said executing a smart contract and said executing a consensus algorithm are performed by each of the plurality of network endpoint nodes, while said generating and sending an acceptance response (or a denial response) and said updating the network access log is performed only by the policy decision point leader.

Some embodiments of the method disclosed herein may additionally include receiving client information from the client device, and attesting to the client information received from the client device prior to generating and sending an acceptance response to the client device. In such embodiments, the acceptance response may be generated and sent to the client device only if the client information is verified during said attesting. If the client information is not verified during said attesting, the method may generate and send a denial response to the client device. In some embodiments, said attesting may be performed by each of the plurality of network endpoint nodes via execution of the smart contract.

In some embodiments, said attesting may include comparing one or more Trusted Platform Module (TPM) Platform Configuration Register (PCR) values included within the client information to one or more desired TPM PCR measurements, which are stored within the smart contract, and verifying the client information if the one or more TPM PCR values included within the client information match the one or more desired TPM PCR measurements. In other embodiments, said attesting may include requesting a TPM of the client device to send a TPM quote, and verifying the client information if the TPM quote is received. In yet other embodiments, said attesting may include using a public key provided by the TPM of the client device to decrypt encrypted data included within the client information, and verifying the client information if the encrypted data is successfully decrypted with the public key.

According to another embodiment, a NAC system provided herein may generally include a plurality of network endpoint nodes included within a network, where each network endpoint node includes a policy information point and a policy decision point. In the embodiments described herein, the policy information point within each network endpoint node may store a distributed ledger including one or more client policies that must be satisfied to access the network, and a smart contract including a set of predefined rules defining network access behaviors and actions. Upon receiving a network access request from a client device outside of the network, the policy decision point within each network endpoint node may execute the smart contract to determine whether the client device should be granted access, denied access or have restricted access to the network, and may execute consensus algorithm to select one of the network endpoint nodes to be a policy decision point leader.

In some embodiments, the policy decision point leader may be configured to send an acceptance response to the client device and generate a session token to allow the client device to access the network, if the client device contains a client policy that satisfies one or more of the predefined rules of the smart contract. Alternatively, the policy decision point leader may be configured to send a denial response to the client device denying access the network, if the client device does not contain a client policy that satisfies one or more of the predefined rules of the smart contract. The distributed ledger may further include a network access log, which is updated by the policy decision point leader. In some embodiments, the network access request received from the client device and the acceptance response or the denial response sent to the client device by the policy decision point leader may be added to the network access log.

In some embodiments, the policy decision point within each network endpoint node may be coupled to receive client information from the client device, and may be configured to execute the smart contract to attest to the client information prior to making a network access decision. In some embodiments, the policy decision point within each network endpoint node may attest to the client information by comparing one or more TPM PCR values included within the client information to one or more desired TPM PCR measurements, which are stored within the smart contract, and verifying the client information if the one or more TPM PCR values included within the client information match the one or more desired TPM PCR measurements. In other embodiments, the policy decision point within each network endpoint node may attest to the client information by requesting a TPM of the client device to send a TPM quote, and verifying the client information if the TPM quote is received. In yet other embodiments, the policy decision point within each network endpoint node may attest to the client information by using a public key provided by the TPM of the client device to decrypt encrypted data included within the client information, and verifying the client information if the encrypted data is successfully decrypted with the public key.

In some embodiments, the policy decision point leader may be configured to send an acceptance response to the client device and generate a session token to allow the client device to access the network, if the client device contains the client policy that satisfies the one or more predefined rules of the smart contract and the client information is verified during the attestation. Alternatively, the policy decision point leader may be configured to send a denial response to the client device denying access to the network, if the client device does not contain a client policy that satisfies the one or more predefined rules of the smart contract or the client information is not verified during the attestation.

In some embodiments, the distributed ledger stored within each policy information point may further include a network access log, which includes a list of network access requests received from client devices attempting to access the network, and a decision made by the policy decision point leader to grant, deny or restrict network access. In such embodiments, the policy decision point leader may be further configured to update the network access log stored within the distributed ledger to include a log of the network access request received from the client device and the acceptance response or denial response subsequently generated by the policy decision point leader.

BRIEF DESCRIPTION OF THE DRAWINGS

Other advantages of the present disclosure will become apparent upon reading the following detailed description and upon reference to the accompanying drawings in which.

Figure 1:
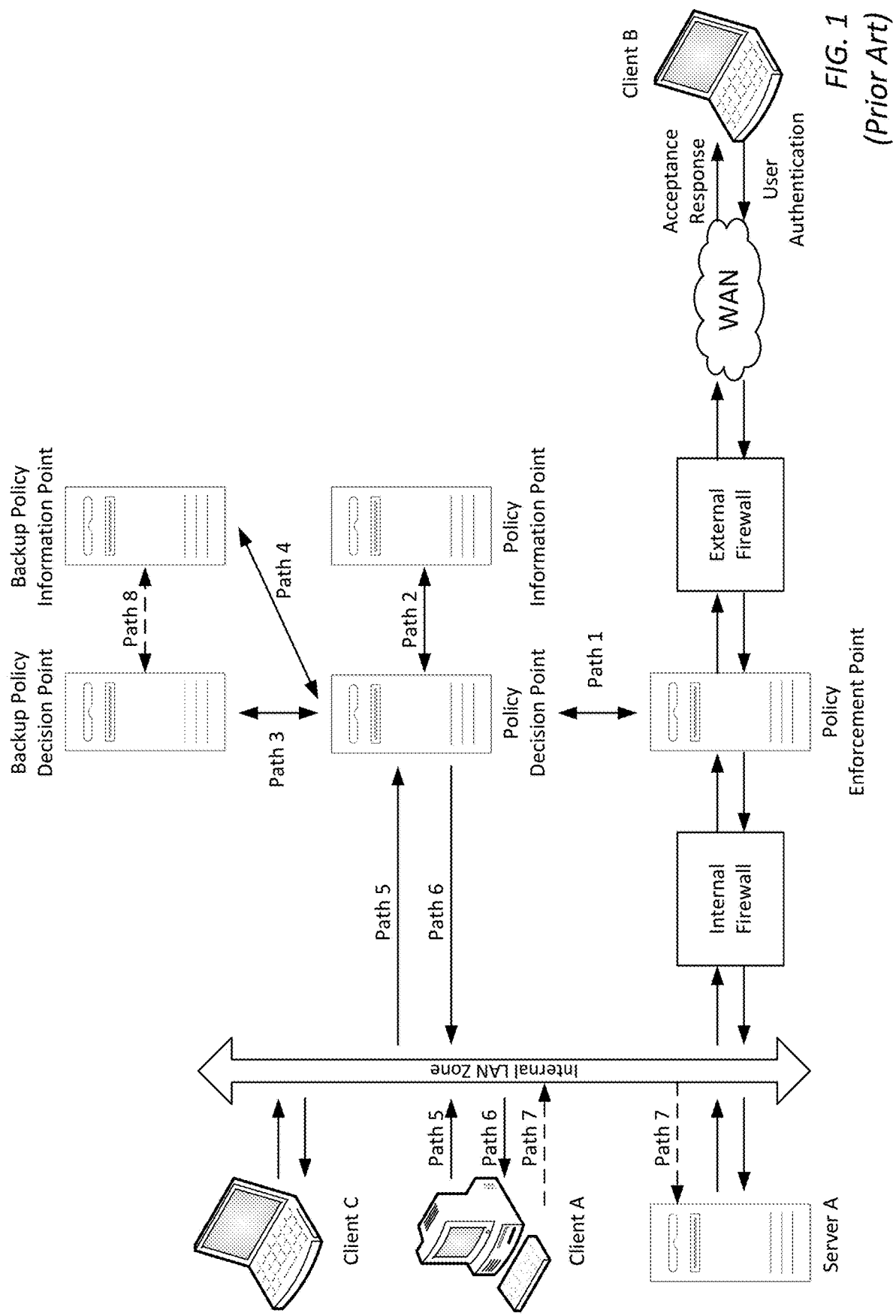
FIG. 1 (PRIOR ART) is a block diagram of a centralized network access control (NAC) system comprising a primary/backup policy information point, a primary/backup policy decision point and a primary enforcement point.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 2:
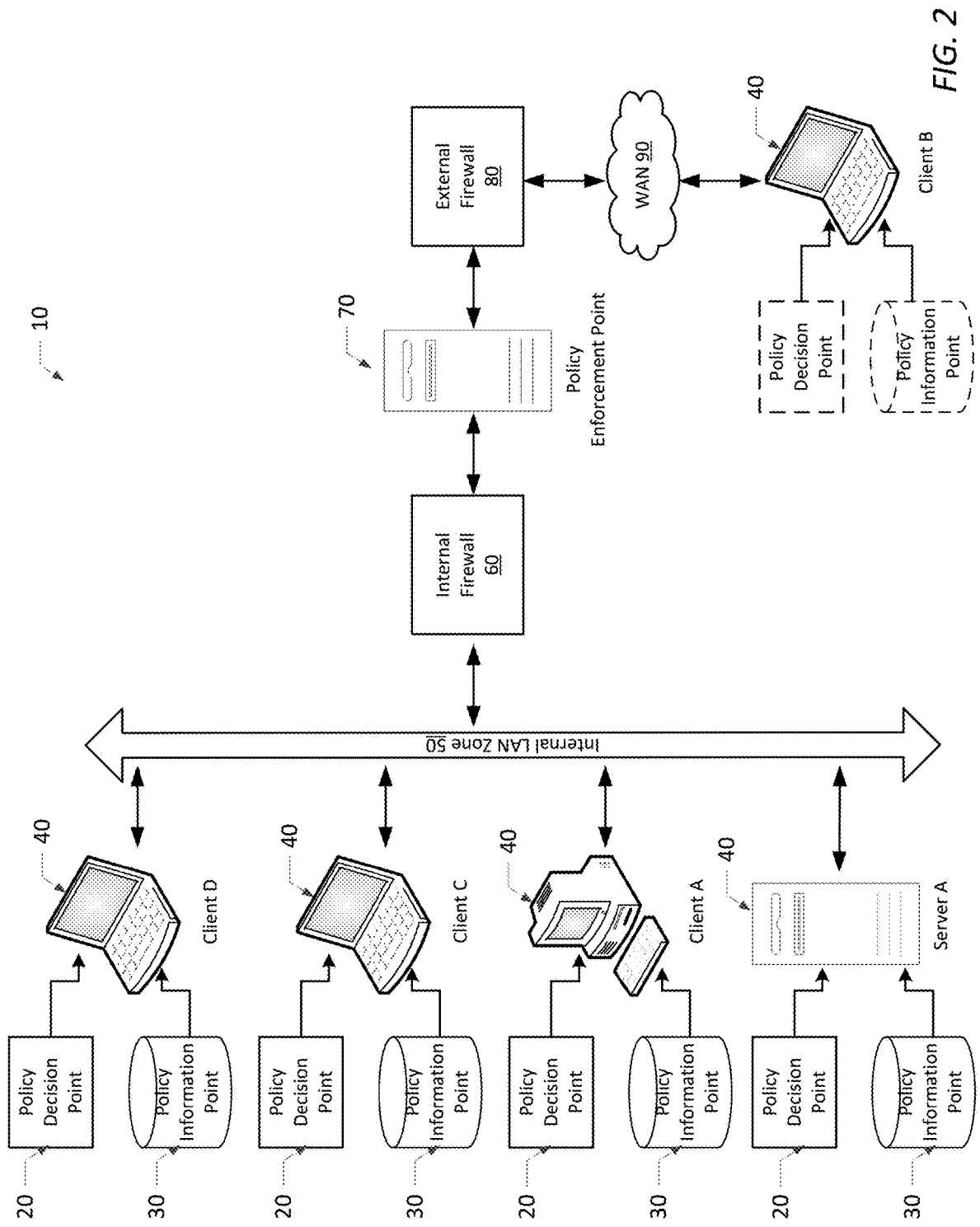
FIG. 2 is a block diagram illustrating a distributed network access control (NAC) system in accordance with one embodiment of the present disclosure, in which policy decision points and policy information points are distributed across a plurality of network endpoint devices.

FIG. 2 is a block diagram of a network access control (NAC) system in accordance with one embodiment of the present disclosure. Unlike the centralized NAC system shown in FIG. 1, the NAC system 10 shown in FIG. 2 distributes network access control policy information points 20 and policy decision points 30 across a plurality of network endpoint nodes 40 included within a network. In some embodiments, the policy information points 20 and policy decision points 30 may be distributed across all internal network endpoint nodes 40 (e.g., Client A, Client C, Client D and Server A), which are connected to an internal network 50 (e.g., an internal LAN) via a wired and/or wireless connection and operate within an internal firewall 60 protecting the network 50. In other embodiments, the policy information points 20 and policy decision points 30 may also be distributed across all external network endpoint nodes 40 (e.g., Client B), which operate outside of an external firewall 80, yet are connected to the internal LAN 50 via another network 90, such as a Wide Area Network (WAN), one example of which is the Internet.

However, policy information points 20 and policy decision points 30 may not be distributed to external network endpoint nodes 40 (e.g., Client B) until such nodes are authenticated, authorized and granted access to the internal network 50 by the distributed NAC system 10 shown in FIG. 2.

The policy information points 20 distributed across network endpoint nodes 40 collect information about each networked client device (e.g., Client A, Client C, and Client D) and network resource (e.g., Server A) connected to internal network 50, as well as each client device (e.g., Client B) requesting access to the internal network. More specifically, and as described in more detail below, each policy information point 20 contains a distributed ledger, i.e., a local copy of a shared database, which is stored within each of the network endpoint nodes 40. In one embodiment, the distributed ledger may contain client information, client policies and a network access log. In some embodiments, the distributed ledger may further contain a smart contract.

In general, a distributed ledger is a database that is distributed or shared across several nodes on a peer-to-peer network, where each node replicates and saves an identical copy of the ledger and updates itself independently. When a ledger update happens, each network node constructs the new transaction record, and the nodes vote by consensus algorithm on which copy of the ledger is correct. Once a consensus is reached, all network nodes update themselves by appending the new transaction record onto the transaction history of the distributed ledger. As such, a "distributed ledger" is a local copy of a shared database, which only accepts appended, updated transaction records once consensus has been reached amongst all network nodes containing the ledger.

When a client device requests access to internal network 50, the client device may be asked to provide information about the client device (i.e., "client information") to one or more of the policy decision points 30. If the client device is subsequently granted access to internal network 50, at least a portion of the client information may be appended to the distributed ledger stored within each of the policy information points 20. Examples of client information include, but are not limited to, client identity information, Trusted Platform Module (TPM) Platform Configuration Register (PCR) values, a TPM-generated key, valid BIOS logs, valid OS logs, configuration information (e.g., BIOS settings), user authentication information (such as username and/or password), current geographic location, connected network SSID's, IP address, BIOS configuration attributes, SMBIOS data, ACPI tables, device serial numbers, battery health, screen size, software/driver manifest, software/driver version information, etc. In some embodiments, the portion of the client information appended to the distributed ledger may include client identity information, such as MAC address, serial number or some other identifier. In other embodiments, a TPM quote (i.e., a summary of the measurements of the client BIOS configuration in a cryptographically verifiable format) from the client device may additionally or alternatively be appended to the distributed ledger. When included, a TPM quote may prove that the client device was in a specific state at a specific time when the client device joined the internal network 50.

In addition (or alternative) to storing client information, the distributed ledger may contain one or more client policies for each networked client device (e.g., Client A, Client C, and Client D) and network resource (e.g., Server A) connected to internal network 50. In general, client policies define desired system configurations, conditions and/or data that prove or imply that the client device is safe to join or access the network, and are generally set by a network administrator. A client device requesting access to the internal network or the network resource must satisfy the client policies stored within the distributed ledger before network access is granted to the client device. Examples of client policies that may be stored within the distributed ledger include, but are not limited to, policies that specify: Safeboot must be enabled, the hard drive must be encrypted, the webcam must be disabled, the TPM must be enabled and owned by the OS, the TPM PCR values must have certain values, the BIOS logs must be valid, the OS logs must be valid, and the IP address associated with the device must not be within a particular range (e.g., known IP ranges for embargoed countries).

As known in the art, TPM PCR values are cryptographic hashes of configuration data, which is stored in the TPM in a tamper-resistant way. For example, BIOS settings are hashed during boot and stored in TPM PCR1. In some embodiments, the client information stored on the distributed ledger may be a TPM PCR1 measurement (retrieved by reading the PCR directly) or a TPM PCR1 quote (i.e., a signed version of that same value). In such embodiments, a client policy may include an expected TPM PCR1 hash value, which would represent a specific configuration in the system. In other embodiments, a programmatic interface may be used to read each of the configuration values and to compare the read values to expected values stored in a file. In such embodiments, the reference file with expected values would be stored as client policy in the distributed ledger.

In some embodiments, the distributed ledger may further include a network access log containing a list or log of network access requests submitted by client devices attempting to access internal network 50, and the decision made by the policy decision points 30 to grant, deny or restrict network access. In other embodiments, the network access log may contain a list of approved client devices (e.g., Client A, Client C, and Client D) and network resources (e.g., Server A) that have been granted access to internal network 50 and are currently connected to the internal network. If a networked client device is disconnected from or leaves the internal network, the client device may be removed from the list of approved client devices in the network access log, in some embodiments. If the same client device subsequently requests access to internal network 50, the client device must be re-verified using the techniques described herein before it is allowed to rejoin the network.

In other embodiments, the network access log may contain a list of all client devices/network resources that have been granted access to internal network 50, a descriptor designating whether the client device/network resource is currently connected to (and/or disconnected from) the internal network, and/or a timestamp indicating the time at which the client device/network resource connected to (and/or disconnected from) the internal network. When a client device leaves internal network 50 and subsequently attempts to rejoin the network, NAC system 10 may use the network access log to re-verify the client device and make network access decisions. In one example, the verification process could use the network access log to determine if the client device has been off the network for too long, and thus, should be denied access. In another example, the verification process could use the network access log to detect spoofing attacks. For example, if a client device leaves the network, or joins the network in an out-of-sequence way, NAC system 10 may decide to prevent network access, or may use the network access log to look for suspicious information. Examples of suspicious information include, but are not limited to, checking to see if a client device leaves the network, and then leaves a second without joining once in between, or if a client device joins the network and then requests to join a second time without leaving the network).

In general, a smart contract is a self-verifying, self-executing and tamper resistant contract or agreement between parties that is implemented in computer program code and contains a set of rules under which the parties agree to interact with each other. If and when the predefined rules are met, the agreement is automatically enforced by the smart contract. As such, a smart contract facilitates, verifies, and enforces the negotiation or performance of an agreement or transaction.

In the context of the present disclosure, a smart contract including a set of predefined rules that define good/bad behavior of client devices that may attempt to access internal network 50, along with the actions that should be taken (e.g., grant network access, deny network access or restrict network access to certain network resources) when such behavior is observed. Good/bad behavior is based on a client device's adherence to the client policy (or policies) stored in the distributed ledger. If a client device adheres to client policy the majority of the time they request network access, that client device is considered to exhibit "good" behavior that would satisfy the predefined rules of the smart contract. On the other hand, if a client device fails policy often, that client device is considered to exhibit "bad" behavior that would not satisfy the terms of the smart contract. Examples of "good" behavior that may satisfy the pre-defined rules of the smart contract and enable a client device to be granted access to internal network 50 include, but are not limited to, the client device has only connected to known safe IP addresses (per a whitelist defined in policy) since the last time it connected, or the client device didn't connect to any resources since the last time it was connected. Examples of "bad" behavior that fail to meet the smart contract rules, and therefore, cause a client device to be denied access to internal network 50, or to have restricted access to certain network resources, include but are not limited to, the client device installed unknown or unauthorized software, the client device accessed known malicious IP addresses or allowed other unauthorized access to the client device.

In some embodiments, the distributed ledger contained within each of the policy information points 20 may store a smart contract including a set of predefined rules defining network access behaviors and actions. In other embodiments, the distributed ledger may store a link to a smart contract, which is stored within another location of a network endpoint device 40 (e.g., a networked client device or network resource) connected to internal network 50. In yet other embodiments, the smart contract may simply be stored within computer readable storage device (e.g., HDD or SSD) or a computer readable memory (e.g., a non-volatile memory device or Flash memory) of each network endpoint device 40. Regardless of where the smart contract is stored, each network endpoint device 40 may contain an identical copy of the smart contract used to grant/deny/restrict access to internal network 50.

By distributing policy information points 20, the NAC system 10 shown in FIG. 2 improves fault tolerance without the use of backup policy information points, which as shown in FIG. 1, are constantly run in the background but rarely used. Spreading the burden of the tolerance across all network endpoint nodes 40 negates the need for expensive centralized equipment, and therefore, reduces the total cost of ownership. In addition, since the policy information points 20 are implemented as a distributed ledger, the policy information points are more secure than if they were implemented on a single device.

The policy decision points 30 distributed across network endpoint nodes 40 receive network access requests and client information from client devices attempting to access internal network 50, and execute smart contracts to determine if the client devices should be granted/denied/restricted access to the internal network. As described in more detail below, each policy decision point 30 may include a transaction processor, which executes policy decision point instructions, including smart contracts and consensus algorithms. In some embodiments, the transaction processor may be a host processor, an embedded controller, a security processor or trusted execution environment (such as Intel SGX, Intel TXT, a Global Platform TEE, Intel TXE, Intel CSME, AMD PSP, etc.) within a network endpoint node 40.

When a client device requests access to internal network 50, the client device may be asked to provide it's most current client information to one or more of the policy decision points 30. As noted above, client information may include, but is not limited to, client identity information, Trusted Platform Module (TPM) Platform Configuration Register (PCR) values, a TPM-generated key, valid BIOS logs, valid OS logs, configuration information (e.g., BIOS settings), user authentication information (such as username and/or password), current geographic location, connected network SSID's, IP address, BIOS configuration attributes, SMBIOS data, ACPI tables, device serial numbers, battery health, screen size, software/driver manifest, software/driver version information, etc. Once client information is provided, each of the policy decision points 30 connected to internal network 50 may execute a local copy of the smart contract to determine if the client device should be granted/denied access to the internal network, or be granted restricted access to certain network resources.

In some embodiments, the smart contract may grant a client device access to internal network 50, or to a network resource (such as Server A), if the policy information point (distributed ledger) 20 stored within the client device contains the correct client policy for accessing the network or network resource. As used herein, a "correct client policy" is one that meets one or more pre-defined rules specified in the smart contract. If the client device does not contain the correct client policy, the smart contract may deny or restrict access to the internal network.

In some embodiments, the smart contract may check or attest to the client information, which was provided by the client device to the policy decision points 30, before granting access to the internal network. In one example, the smart contract may compare one or more TPM PCR values included within the client information to one or more desired TPM PCR measurements, which are stored within the smart contract or the client policy, before granting access to the internal network. In another example, the smart contract may use a public key provided by the TPM to decrypt some data (e.g., a TPM quote) that was encrypted by the TPM and provided as client information, or to verify a signature provided by the TPM. In some embodiments, a copy of the TPM's public key can be stored in the distributed ledger, or shared along with a TPM quote (TPM signed ledger). In the embodiments described above, the smart contract may grant network access to the client device if the TPM PCR values included within the client information match the desired TPM PCR measurement, or if the public key provided by the TPM is able to decrypt the encrypted data previously provided as client information.

In other embodiments, the smart contract may use the TPM of the client device to attest to the client information provided by the client device. For example, the smart contract could ask the TPM of the client device for a new TPM quote (which implies that the client device has access to a functional TPM) with it's own unique private signing keys before granting access to the internal network. If a new TPM quote is received, the smart contract may determine to grant network access to the client device.

In addition to executing the smart contract, each of the policy decision points 30 connected to internal network 50 executes a consensus algorithm to vote, or come to a consensus on, whether the client device should be granted network access. In addition, the consensus algorithm may be used to select a policy decision point leader, which makes the final determination on granting/denying/restricting network access to the client device and performs additional actions based on the network access decision. Examples of consensus algorithms include, but are not limited to, Proof of Work (PoW), Proof of Elapsed Time (POET), Proof of Stake (PoS), delegated PoS, Proof of Authority (PoA) and Proof of Importance (PoI). In one example implementation, policy decision points 30 may use POET to determine which of the network endpoint nodes 40 has been connected to internal network 50 the longest, and to select that network endpoint node as the policy decision point leader. It is noted, however, that policy decision points 30 are not restricted to any particular consensus algorithm and may use alternative means for randomly selecting a policy decision point leader and/or voting on network access decisions.

If the rules of the smart contract are satisfied or met, the policy decision point leader may send an acceptance response to the client device and generate a session token, which allows the client device to access the internal network or network resource. If the rules of the smart contract are not met, the policy decision point leader may generate and send a denial response to the client device. For client devices located within internal network 50 (e.g., Client A, Client C or Client D), acceptance/denial responses can be sent via interconnections within the internal network. For client devices located outside internal network 50 (e.g., Client B), acceptance/denial responses may be supplied via internal network 50, internal firewall 60, policy enforcement point 70, external firewall 80 and WAN 90. Once a network access decision is made and acceptance/denial responses are sent, the policy decision point leader will update the network access log stored within the distributed ledger to include a log of the network access request submitted by the client device and the network access decision made by the policy decision points 30.

By distributing policy decision points 30 and providing all network endpoint nodes 40 equal opportunity to be policy decision point leaders, the NAC system 10 shown in FIG. 2 improves fault tolerance without the use of backup policy decision points, which as shown in FIG. 1, are constantly run in the background but rarely used. In addition, physically distributing the policy decision points 30 across network endpoint nodes 40 makes them resistant to mechanical device failures (such as failed hard drives, memory sticks, network controllers, etc.), while geographically distributing the policy decision points 30 makes the NAC system resilient against natural disasters (such as earthquake, tornado, fire). Logically distributing the policy decision points 30 throughout different subnets in a network makes them resistant to network bandwidth-limited denial of service (DoS) attacks and mitigates other cyber-attacks on NAC system 10.

For example, distributing policy decision points 30 across all network endpoint nodes 40 reduces the likelihood that any one device will be chosen as the policy decision point leader, and therefore, reduces the chance of a malicious device having control over network access decisions. In addition, some cyber-attacks attempt to infiltrate networks by changing a locally stored copy of the smart contract to improve the chance of being selected policy decision point leader. Since smart contracts are distributed across all network endpoint nodes 40 in NAC system 10, any smart contracts altered by cyber-attacks will simply be invalidated, leaving the rest of the policy decision points 30 to execute unadulterated copies of the smart contract.

In some embodiments, policy decision points 30 may be a blockchain OS application, which is stored within each network endpoint node 40 (e.g., as policy decision point instructions 286 of FIG. 7) and configured to execute smart contracts, run consensus algorithms, and update the distributed ledger. Examples of blockchain OS applications suitable for use within policy decision points 30 include, but are not limited to, Intel's Sawtooth application, in addition to open source blockchain applications, such as Ethereum and Hyperledger Fabric. In other embodiments, policy decision points 30 may utilize a cloud-based Blockchain-as-a-Service (BaaS) platform to execute smart contracts, run consensus algorithms, and update the distributed ledger. Examples of BaaS platforms suitable for use by policy decision points 30 include, but are not limited to, Microsoft Blockchain on Azure, IBM Blockchain services, Amazon's Blockchain on AWS, etc.

Figure 3:
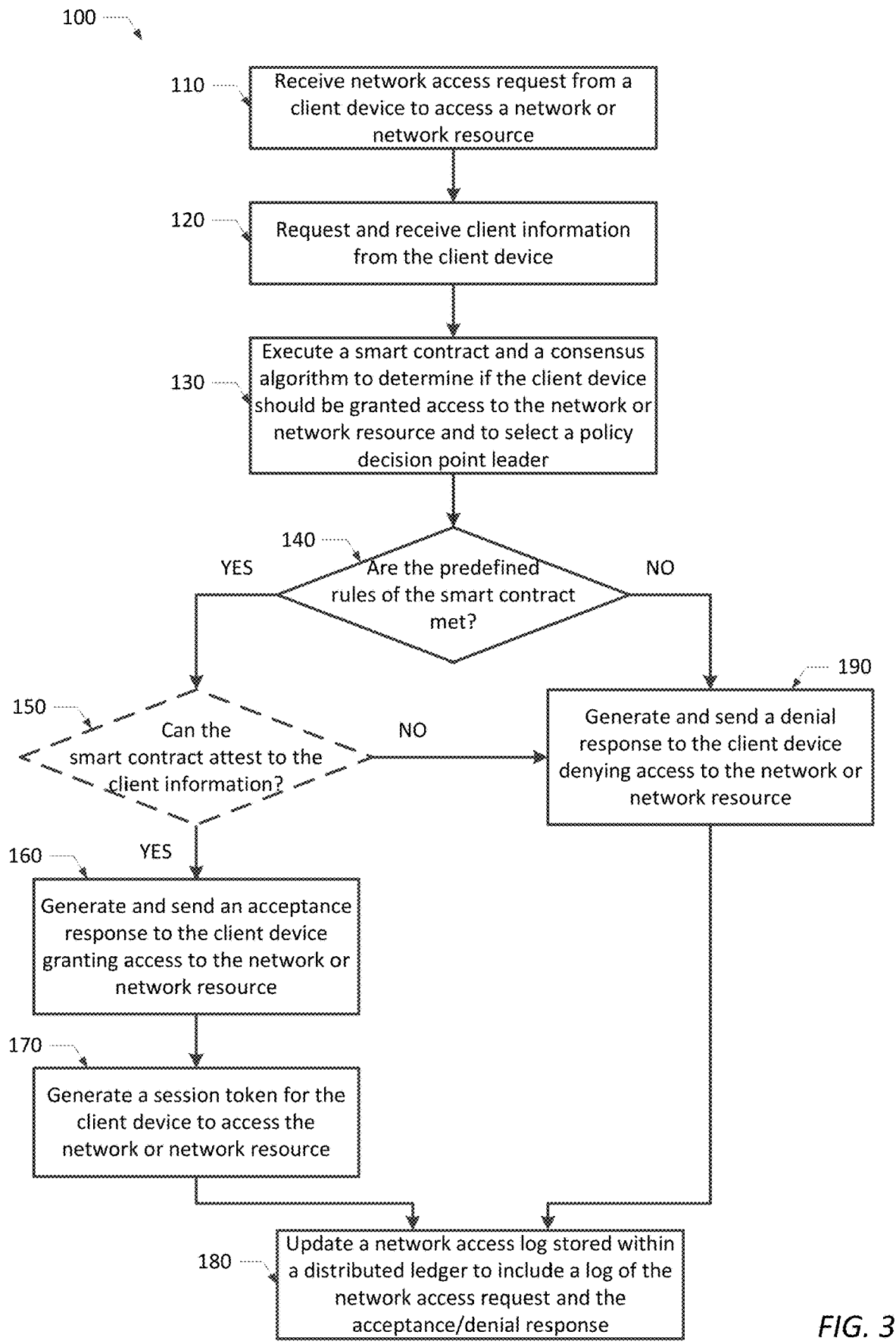
FIG. 3 is a flowchart diagram illustrating one embodiment of a method that may be performed by one or more policy decision points of the NAC system shown in FIG. 2 to determine if a client device should be granted access to an internal network or network resource.

FIG. 3 illustrates one embodiment of a method 100 that may be performed by one or more policy decision points 30 of the distributed NAC system 10 shown in FIG. 2 to determine if network access should be granted to a client device requesting network access. In one embodiment, method 100 may begin (in step 110) upon receiving a network access request from a client device to access a network (such as internal LAN 50 of FIG. 2 or mesh network 52 of FIG. 6) or a network resource. When a network access request is received from a client device, one or more of the policy decision points 30 may request and receive client information from the client device (in step 120). As noted above, client information may include, but is not limited to, client identity information, Trusted Platform Module (TPM) Platform Configuration Register (PCR) values, a TPM-generated key, valid BIOS logs, valid OS logs, configuration information (e.g., BIOS settings), user authentication information (such as username and/or password), current geographic location, connected network SSID's, IP address, BIOS configuration attributes, SMBIOS data, ACPI tables, device serial numbers, battery health, screen size, software/driver manifest, software/driver version information, etc.

In step 130, each policy decision point 30 within distributed NAC system 10 may execute a smart contract and a consensus algorithm to select a policy decision point leader and to determine whether or not the client device should be granted access to the internal network or network resource. Although not limited to any particular consensus algorithm, policy decision points 30 may use a Proof of Elapsed Time (POET) algorithm in one example implementation of the disclosed method to determine which of the network endpoint nodes 40 has been connected to the internal network the longest, and to select that network endpoint node as the policy decision point leader.

In step 140, each policy decision point 30 within distributed NAC system 10 may determine if the predefined rules of the smart contract for granting network access have been met. In one example, the policy decision points 30 may independently determine, via execution of the smart contract and consensus algorithm (in step 130), that the client device requesting network access should be granted access to the internal network or network resource, if the policy information point (distributed ledger) 20 stored within that client device contains the correct client policy or policies for accessing the internal network or network resource. In another example, the policy decision points 30 may agree that the client device should be granted access to the internal network or network resource, if a TPM-generated key provided by the client device matches the TPM-generated key provided by the client device when the client device last left the internal network.

In some embodiments, if the predefined rules of the smart contract are met (YES branch of step 140) and consensus is reached, the policy decision point leader selected in step 130 generates and sends an acceptance response to the client device granting access to the internal network or network resource (in step 160). In addition, the policy decision point leader generates a session token for the client device to access the internal network or network resource (in step 170), and updates the network access log stored within the distributed ledger to include a log of the network access request received from the client device and the acceptance response subsequently generated by the policy decision point leader (in step 180).

If the predefined rules of the smart contract are not met (NO branch of step 140) and/or consensus is not reached, the policy decision point leader generates and sends a denial response to the client device denying access to the internal network or network resource (in step 190), and updates the network access log to include a log of the network access request received from the client device and the denial response subsequently generated by the policy decision point leader (in step 180).

In other embodiments, the smart contract may be executed to attest to at least a portion of the client information (in step 150), which was received from the client device (in step 120), before granting network access to the client device via generation of an acceptance response (in step 160) and session token (in step 170). In some embodiments, network access may be granted in steps 160 and 170 if the smart contract can attest to, or verify, the client information received from the client device (YES branch of step 150), or may be denied in step 190 if attestation or verification cannot be achieved (NO branch of step 150).

In some embodiments, the attestation performed by the smart contract in step 150 may involve, but is not limited to, comparing one or more TPM PCR values included within the client information to one or more desired TPM PCR measurements, using a public key provided by the TPM to decrypt some data (e.g., a TPM quote) that was previously encrypted by the TPM and provided as client information, or requesting the TPM of the client device to send a new TPM quote. If the TPM PCR values included within the client information match the desired TPM PCR measurement, if the encrypted data can be successfully decrypted with the TPM's public key, or if a new TPM quote is received, the smart contract may determine to grant network access to the client device in steps 160 and 170.

Figure 4:
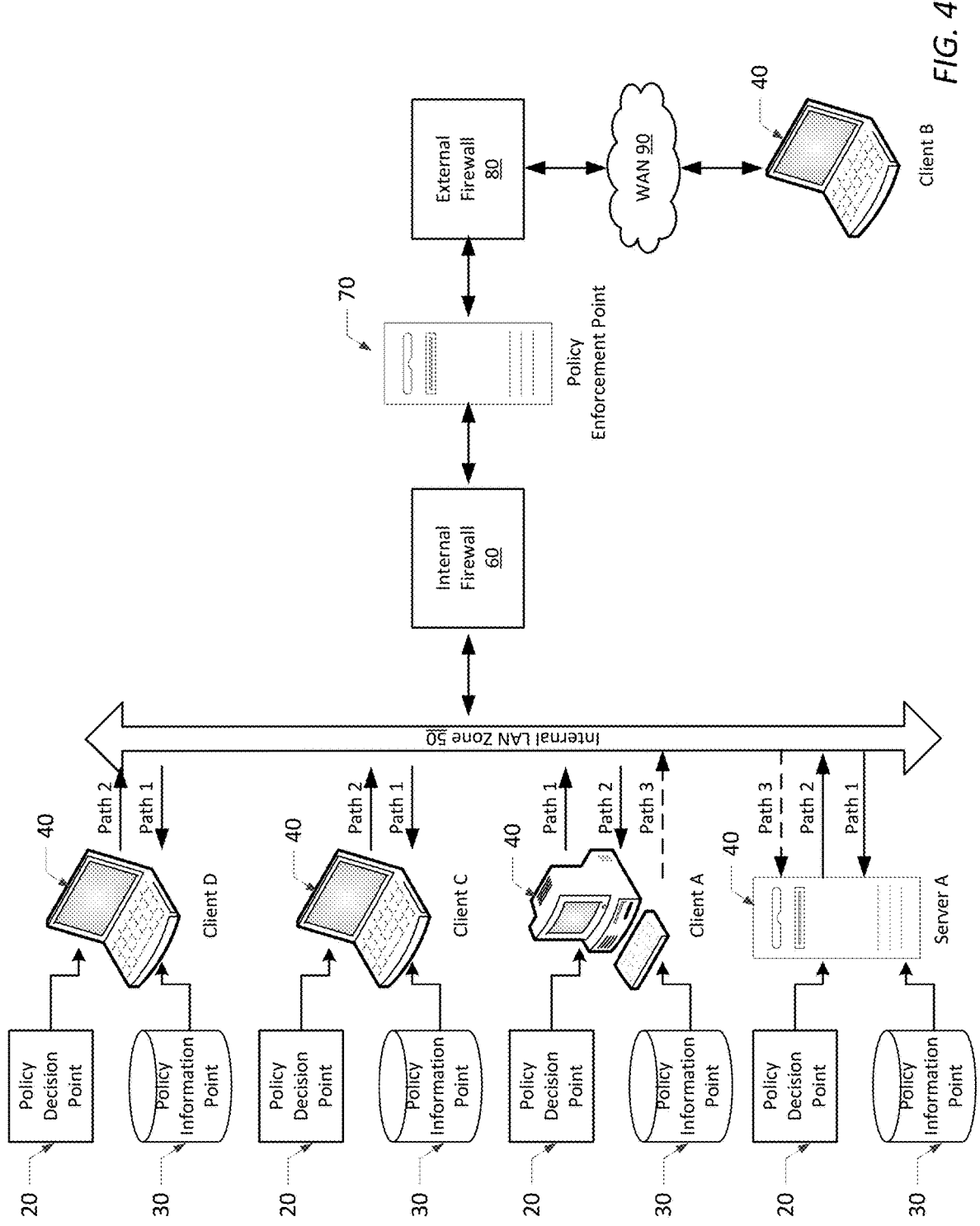
FIG. 4 is another block diagram of the distributed NAC system shown in FIG. 2 illustrating how the distributed NAC system may respond when an internal client device attempts to gain access to a network resource of the internal network.

FIG. 4 illustrates an example use of the distributed NAC system 10 shown in FIG. 2 when an internal client device (e.g., Client A) attempts to access to a network resource (e.g., Server A) of internal network 50 (e.g., an internal LAN zone). In the example shown in FIG. 4, Client A sends a network access request (via path 1) to the internal LAN zone requesting access to the computing resources of Server A. Upon receiving the network access request (via path 1), all network endpoint nodes 40 (e.g., Client C, Client D and Server A) connected to the internal LAN zone use their policy information point 20 and policy decision point 30 to determine if Client A should be granted access to Server A. More specifically, and as described above, all network endpoint nodes 40 execute a smart contract and consensus algorithm to come to a consensus on whether Client A should be granted access to Server A. For example, Client C, Client D and Server A may each agree, via execution of the smart contract, that Client A should be granted access to Server A if Client A contains the correct client policy to access Server A. In some embodiments, the smart contract may attest to at least a portion of the client information received from Client A prior to granting network access to Server A.

As noted above, one of the network endpoint nodes 40 is selected as a policy decision point leader for performing actions in response to the network access decision agreed upon by all network endpoint nodes. If the network endpoint nodes 40 agree to grant Client A access to the computing resources of Server A (e.g., if the smart contract determines that Client A contains the correct policy, and the smart contract can attest to the client information), the policy decision point leader sends an acceptance response (via path 2) to Client A granting access to Server A, and generates a session token for Client A to access Server A (via path 3). The policy decision point leader also updates the network access log stored within the distributed ledger to include a log of the network access request received from Client A and the acceptance response subsequently generated by the policy decision point leader. If the network endpoint nodes 40 agree that Client A should not be granted access to the computing resources of Server A (e.g., if the smart contract determines that Client A contains an incorrect policy, or if the smart contract cannot attest to the client information), the policy decision point leader sends a denial response (via path 2) to Client A denying access to Server A.

Figure 5:
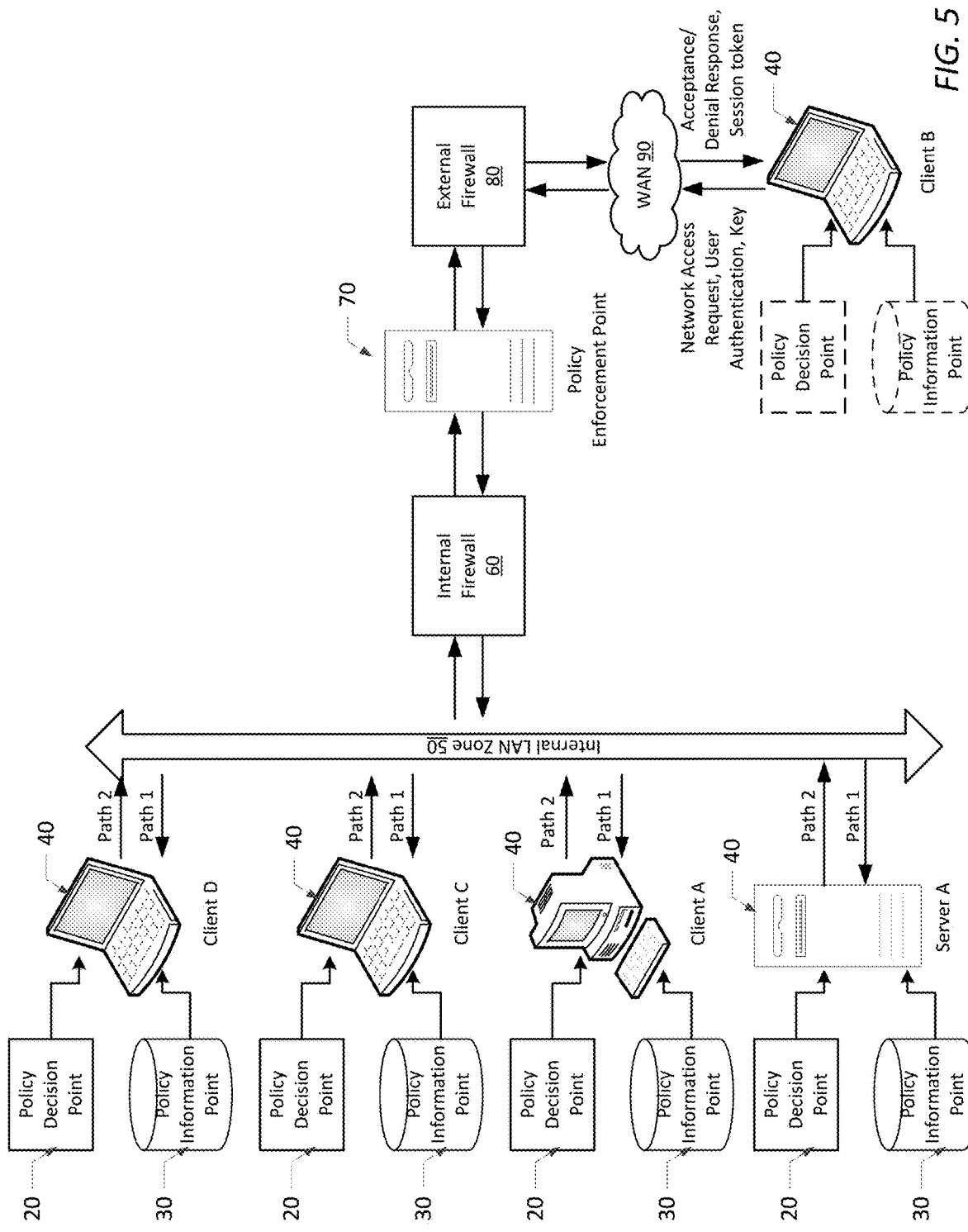
FIG. 5 is another block diagram of the distributed NAC system shown in FIG. 2 illustrating how the distributed NAC system may respond when an external client device attempts to gain access to the internal network.

FIG. 5 illustrates an example use of the distributed NAC system 10 shown in FIG. 2 when an external client device (e.g., Client B) attempts to access to internal network 50 (e.g., an internal LAN zone). In the example shown in FIG. 5, Client B sends a network access request requesting access to the internal LAN zone. Since Client B is located outside internal network 50, the network access request is communicated to the network endpoint nodes 40 connected to the internal network via WAN 90, external firewall 80, policy enforcement point 70 and internal firewall 60. Client B may also send client information to the network endpoint nodes 40 connected to internal network 50 along with the network access request, or prior/subsequent to sending the network access request. In some embodiments, for example, Client B may send user authentication information (e.g., user name and/or password) and a key generated by a Trusted Platform Module (TPM) of Client B regarding all client policies, as well as a BIOS policy (i.e., current BIOS settings), associated with Client B. In some embodiments, the TPM-generated key may represent the cryptographic state of the distributed ledger currently stored within Client B.

In the example shown in FIG. 5, policy enforcement point 70 communicates with the policy decision point leader asking all network endpoint nodes 40 (e.g., Client A, Client C, Client D and Server A) connected to internal network 50 to attest to the client information provided by Client B and to provide a network access decision. In some embodiments, Client A, Client C, Client D and Server A may reach a consensus that Client B should be granted access to internal network 50 by agreeing that when Client B previously left internal network 50, Client B reported a TPM-generated key that represented the cryptographic state of Client B's distributed ledger. In other words, Client A, Client C, Client D and Server A may compare the TPM-generated key provided along with the current network access request to the last TPM-generated key provided when Client B previously left the network to determine if the keys match. As noted above, consensus may be reached by each network endpoint node 40 executing a smart contract and consensus algorithm to agree upon a network access decision.

If Client B provided (in the client information sent along with the network access request) the correct TPM-generated key to access internal network 50, the policy decision point leader may send an acceptance response and a session token to Client B, via the policy enforcement point 70, allowing Client B to access the internal network. If Client B did not provide the correct TPM-generated key to access internal network 50, the policy decision point leader sends a denial response to Client B, via the policy enforcement point 70, denying network access to Client B. In both cases, the policy decision point leader updates the network access log stored within the distributed ledger to include a log of the network access request received from Client B and the acceptance/denial response subsequently generated by the policy decision point leader.

Figure 6:
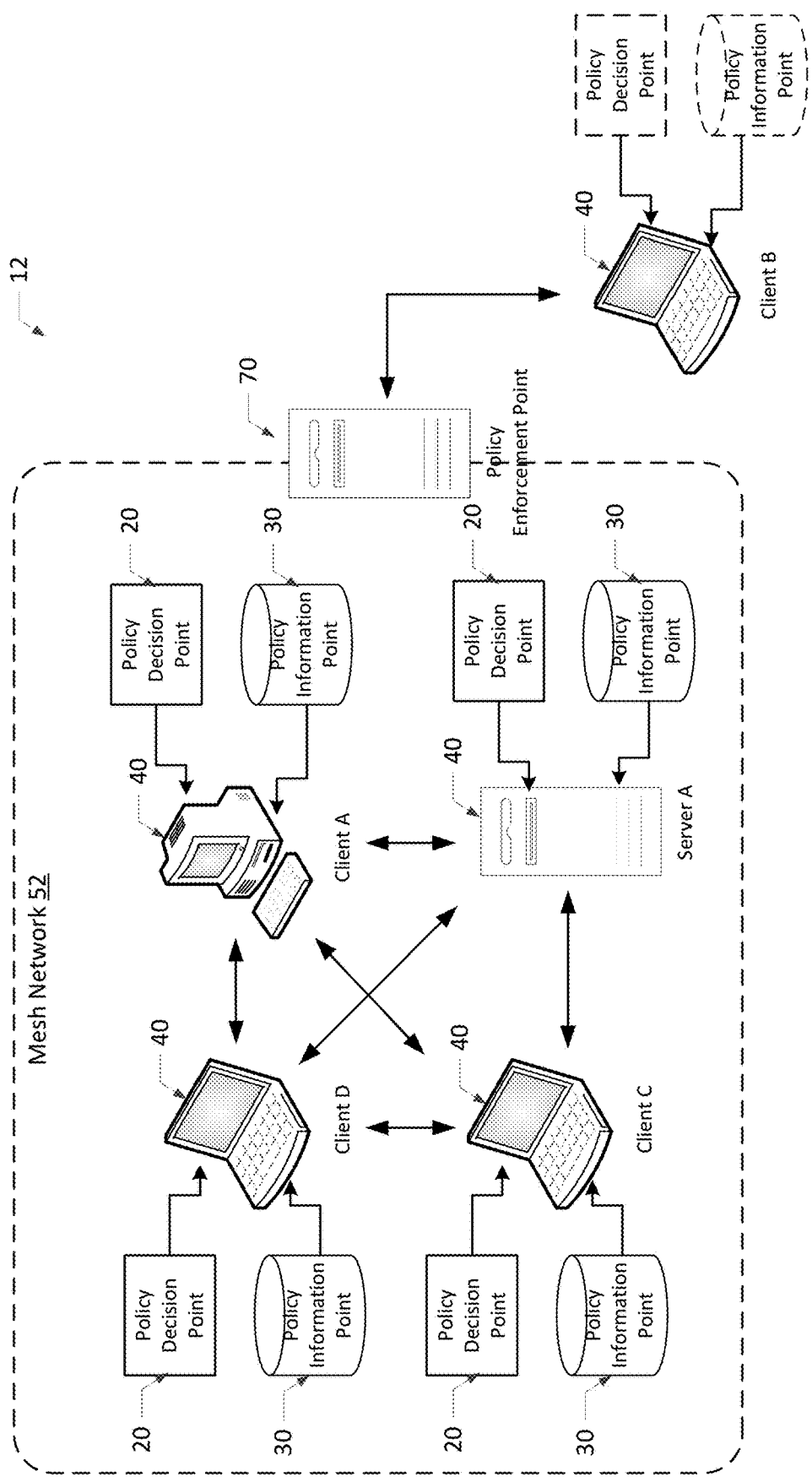
FIG. 6 is a block diagram illustrating an alternative embodiment of a distributed NAC system in accordance with the present disclosure.

FIG. 6 illustrates an alternative embodiment of a distributed NAC system 12 in accordance with the present disclosure Like the NAC system 10 embodiment shown in FIGS. 2, 4 and 5, the NAC system 12 shown in FIG. 6 distributes policy information points 20 and policy decision points 30 across a plurality of network endpoint nodes 40, including both networked client devices (e.g., Client A, Client C, and Client D) and network resources (e.g., Server A). The policy information points 20 and policy decision points 30 included within the mesh network 52 may be generally configured as described above.

Unlike NAC system 10, which illustrates and describes a network access control system for protecting an internal network 50 (e.g., an internal LAN), the distributed NAC system 12 shown in FIG. 6 controls network access to a mesh network 52 of networked endpoint nodes 40. When a client device (e.g., Client B) outside of mesh network 52 wishes to join the mesh network, the client device sends a network access request (and client information) to the mesh network where it is evaluated by each of the policy decision points 30 included within the mesh network. In the embodiment shown in FIG. 6, each network endpoint node 40 included within the mesh network 52 acts as a policy enforcement point 70 for the NAC system 12. Thus, each network endpoint node 40 within mesh network 52 receives the network access request (and client information) from the client device (e.g., Client B) requesting network access, and executes policy decision point instructions to make network access decisions.

As noted above, the policy decision points 30 execute a smart contract and a consensus algorithm to select a policy decision point leader and to determine if the client device should be granted/denied access to the mesh network, or granted restricted access to one or more network resources. In some embodiments, the smart contract executed by the policy decision points 30 may additionally check or attest to the client information, which was provided by the client device to the policy decision points 30, before granting access to the mesh network 52. When an outside client device (e.g., Client B) is granted access to the mesh network 52, the client device may share a unique secret (or secrets) with the networked endpoint nodes 40 inside the mesh network. In some embodiments, each interconnect (or channel) between the networked endpoint nodes 40 may be secured using a unique secret.

Figure 7:
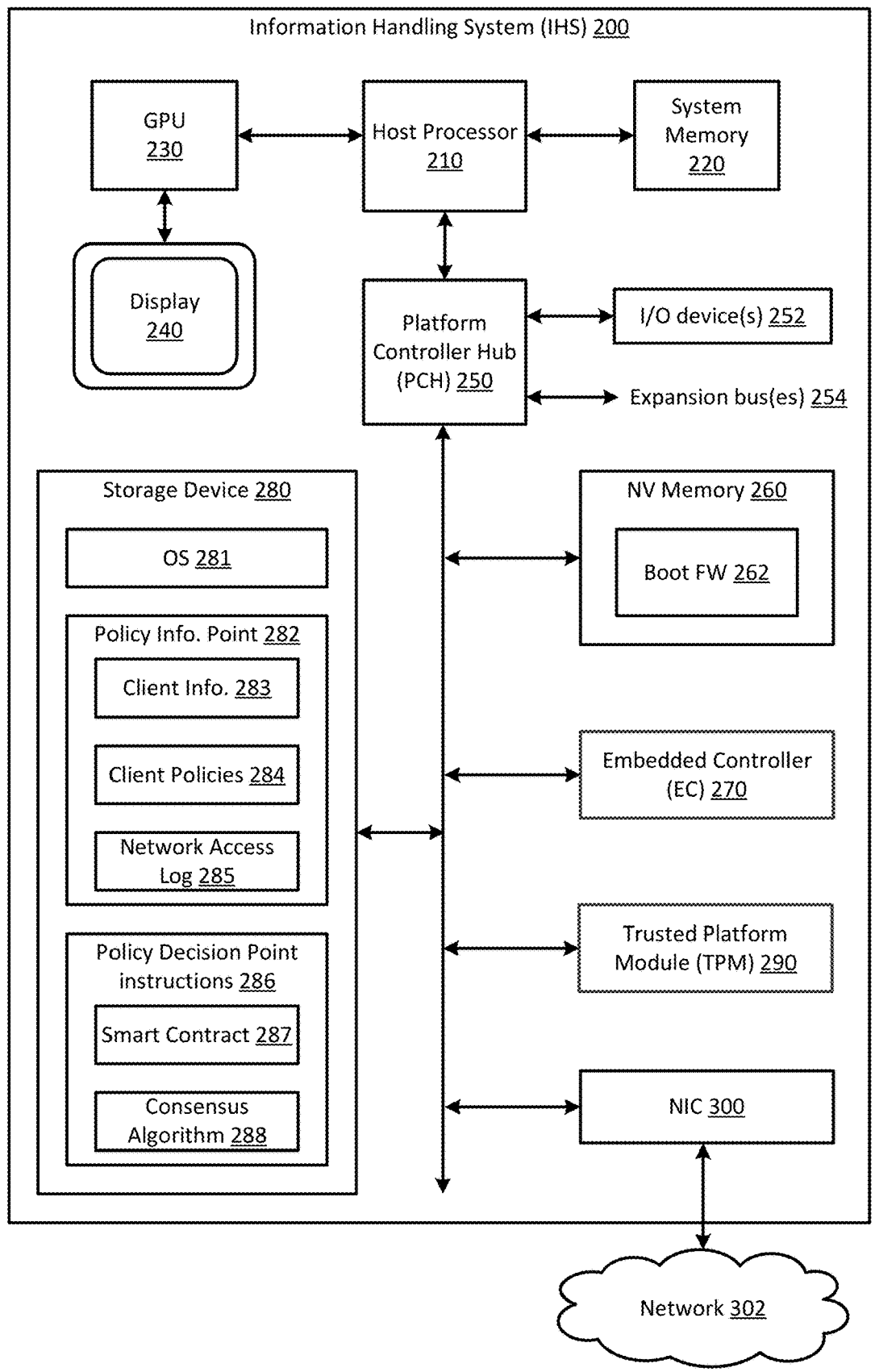
FIG. 7 is a block diagram of an information handling system in accordance with one embodiment of the present disclosure.

FIG. 7 is a block diagram of an information handling system 200 (e.g., a desktop computer, laptop computer, tablet computer, server, Internet of Things (IoT) device, etc.) as it may be configured according to one embodiment of the present disclosure. The information handling system 200 shown in FIG. 7 may represent any one of the network endpoint nodes 40 (e.g., Client A, Client B, Client C, Client D or Server A) requesting network access or network resources in the distributed NAC system 10 shown in FIGS. 2, 4, 5 and 6.

As shown in FIG. 7, IHS 200 may generally include at least one processing device (e.g., at least one host processor) 210, a system memory 220, a graphics processor unit (GPU) 230, a display device 240, a platform controller hub (PCH) 250, one or more input/output (I/O) devices 252, one or more expansion bus(es) 254, a computer readable non-volatile (NV) memory 260, an embedded controller 270, a computer readable storage device 280, a Trusted Platform Module (TPM) 290 and a network interface card (NIC) 300.

It is expressly noted that the IHS configuration shown in FIG. 7 is exemplary only, and that the various methods disclosed herein for controlling network access may be implemented on any type and/or configuration of information handling system having at least at least one processing device, a NIC and a computer readable storage device comprising a policy information point and policy decision point. It will be further understood that while certain components of the information handling system are shown in FIG. 7 for illustrating embodiments of the present disclosure, the information handling system disclosed herein is not restricted to including only those components shown in FIG. 7 and described below.

Host processor 210 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 210 may include at least one central processing unit (CPU) having one or more processing cores. The CPU may include any type of processing device, such as an Intel Pentium series processor, an Advanced Micro Devices (AMD) processor or another processing device. In one embodiment, host processor 210 may be utilized as a transaction processor, which generally functions to execute policy decision point instructions including, for example, smart contracts and consensus algorithms.

System memory 220 is coupled to host processor 210 and generally configured to store program instructions (or computer program code), which are executable by host processor 210. System memory 220 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 230 is coupled to host processor 210 and configured to coordinate communication between the host processor and one or more display components of the IHS. In the embodiment shown in FIG. 7, GPU 230 is coupled to display device 240 and configured to provide visual images (e.g., a graphical user interface, messages and/or user prompts) to the user. In some embodiments, GPU 230 may be coupled to one or more display ports to support additional display functions. Although GPU 230 is shown as a separate processing device in the embodiment of FIG. 7, GPU 130 may be omitted in other embodiments, when the functionality provided thereby is integrated within host processor 210 in a system-on-chip (SoC) design.

In some embodiments, IHS 200 may include other types of processing devices including, but not limited to, a graphics-derivative processor (such as a physics/gaming processor), a digital signal processor (DSP), a security processor, and/or a trusted execution environment (such as Intel SGX, Intel TXT, a Global Platform TEE, Intel TXE, Intel CSME, AMD PSP, etc.). In some embodiments, a security processor or trusted execution environment (not shown in FIG. 7) may be used as a transaction processor for executing smart contracts and consensus algorithms.

Platform controller hub (PCH) 250 is coupled to host processor 210 and configured to handle I/O operations for the IHS. As such, PCH 250 may include a variety of communication interfaces and ports for communicating with various system components, such as input/output (I/O) device(s) 252, expansion bus(es) 254, computer readable NV memory 260, EC 270, computer readable storage device 280, TPM 290 and NIC 300. Examples of communication interfaces and ports that may be included within PCH 250 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit (I$^2$C) interface, a Universal Serial Bus (USB) interface and a Thunderbolt™ interface. Examples of expansion bus(es) 254 that may be coupled to PCH 150 include, but are not limited to, a PCI bus, a PCIe bus, a SATA bus, a USB bus, etc.

I/O device(s) 252 enable the user to interact with IHS 200 and software/firmware executing thereon. In some embodiments, one or more I/O devices 252 may be provided within IHS 200. In other embodiments, I/O device(s) 252 may be separate from the IHS and may interact with the IHS through a wired or wireless connection. Examples of I/O devices 252 include, but are not limited to, keyboards, keypads, touch screens, mice, scanning devices, voice or optical recognition devices, and any other devices suitable for entering or retrieving data. In some embodiments, a user of IHS 200 may use one or more of the I/O devices 252 to provide user authentication information (e.g., username, user password, etc.) to policy enforcement point 70.

Computer readable NV memory 260 may include any suitable type of non-volatile memory and/or Flash memory device. As shown in FIG. 7, NV memory 260 is generally configured to store boot firmware (FW) 262 and other system firmware (not shown). Boot firmware 262 may generally include software and/or firmware modules for specifying hardware configuration settings, system date/time, boot sequence, etc., and may be implemented as a Basic Input/Output System (BIOS) and/or a Unified Extensible Firmware Interface (UEFI). As known in the art, boot firmware 262 may include boot services and runtime services. Boot services are available for execution when the boot firmware owns the system platform during a pre-boot phase before the operating system (OS) is loaded and running. Runtime services, on the other hand, are available for execution while the OS is running (i.e., during OS runtime). In some embodiments, a smart contract may be stored within NV memory 260 (e.g., within a BIOS/firmware storage area), instead of the computer readable storage device 280 discussed below.

Embedded controller (EC) 270 is generally configured to boot the information handling system and perform other functions. EC 270 may generally include read only memory (ROM), random access memory (RAM) and a processing device (e.g., a controller, microcontroller, microprocessor, ASIC, etc.) for executing program instructions stored within its internal ROM and RAM. For example, EC 270 may be configured to execute program instructions (e.g., a boot block) stored within its internal ROM to initiate a boot process for the information handling system. In some embodiments, EC 270 may also be utilized as a transaction processor, which generally functions to execute policy decision point instructions including, for example, smart contracts and consensus algorithms.

When IHS 200 is powered on or rebooted, the processing device of EC 270 may initiate a boot process for the information handling system by executing the boot block stored within the EC ROM while PCH 250 and host processor 210 are in reset. As used herein, an IHS "boot process" is a process or set of operations performed by an information handling system component (e.g., EC 270 and/or host processor 210) to load and execute a boot system (e.g., BIOS and/or UEFI) and prepare the system for OS booting. When the host processor comes out of reset, the host processor retrieves the boot firmware 262 from NV memory 260, stores a local copy of the boot firmware within system memory 220, and executes the boot firmware to configure hardware components of the IHS, perform a Power-On Self-Test (POST) to ensure the hardware configuration is valid and working properly, discover and initialize devices, and launch a bootloader to load OS 281. Once launched, the bootloader within boot firmware 262 retrieves OS 281 from computer readable storage device 280 and loads it into system memory 120.

Computer readable storage device 280 may be any type of persistent, non-transitory computer readable storage device, such as one or more hard disk drives (HDDs) or solid-state drives (SSDs), and may be generally configured to store software and/or data. For example, computer readable storage device 280 may be configured to store an operating system (OS) 281 for the IHS, in addition to other software and/or firmware modules and user data. As known in the art, OS 281 may contain program instructions (or computer program code), which may be executed by host processor 210 to perform various tasks and functions for the information handling system and/or for the user. In one embodiment, OS 281 may be one of the many Windows® operating systems provided by Microsoft.

In addition to OS 281, computer readable storage device 180 may be configured to store a policy information point 282 for IHS 200. Policy information point 282 is a database that stores information about each networked client device and network resource connected to the internal network, as well as each client device requesting access to the internal network. As noted above, policy information point 282 may be implemented as a distributed ledger (i.e., a local copy of a shared database that only accepts appended, updated records once consensus has been reached by all policy decision points on the network) containing, for example, client information 283, client policies 284, and a network access log information 285.

The client information 283 stored within the distributed ledger includes information about each networked client device and network resource connected to the internal network, as well as each client device requesting access to the internal network. Examples of client information 283 include, but are not limited to, client identity information, Trusted Platform Module (TPM) Platform Configuration Register (PCR) values, a TPM-generated key, valid BIOS logs, valid OS logs, configuration information (e.g., BIOS settings), user authentication information (such as username and/or password), current geographic location, connected network SSID's, IP address, BIOS configuration attributes, SMBIOS data, ACPI tables, device serial numbers, battery health, screen size, software/driver manifest, software/driver version information, etc.

Client policies 284 define desired system configurations, conditions and/or data that prove or imply that the client device is safe to join the network, and are generally set by a network administrator. Examples of client policies 284 include, but are not limited to, policies that specify: Safeboot must be enabled, the hard drive mush be encrypted, the webcam must be disabled, the TPM must be enabled and owned by the OS, the TPM PCR values must have certain values, the BIOS logs must be valid, the OS logs must be valid, and the IP address associated with the device must not be within a particular range (e.g., known IP ranges for embargoed countries).

In some embodiments, network access log 285 may include a list or log of network access requests submitted by client devices attempting to access the internal network, and the decision made by the policy decision point leader to grant, deny or restrict network access. In other embodiments, network access log 285 may include a list of client devices that have been granted access to, and are currently connected to, the internal network. In other embodiments, the network access log 285 may contain a list of all client devices that have been granted access to the internal network, a descriptor designating whether the client device is currently connected to (and/or disconnected from) the internal network, and/or a timestamp indicating the time at which the client device connected to (and/or disconnected from) the internal network.

In addition, computer readable storage device 180 may be configured to store policy decision point program instructions (i.e., policy decision point instructions 286), which may be executed by a processing device (i.e., a transaction processor, such as host processor 210 or EC 270) to select a policy decision point leader and determine whether or not a client device requesting network access should be granted access to an internal network or network resource. As noted above, policy decision point instructions 286 may generally include a smart contract 287 and a consensus algorithm 288. The smart contract 287 includes a predefined set of rules that must be satisfied before network access is granted to a client device requesting network access. The predefined set of rules define good/bad behavior of client devices (based on client policy), along with actions taken (e.g., grant network access, deny network access or restrict network access to certain network resources) when such behavior is observed. The policy decision point receives network access requests and client information from client devices attempting to access the internal network, and executes the smart contract 287 and consensus algorithm 288 to determine if client devices should be granted/denied/restricted access to the internal network.

In some embodiments, a copy of the smart contract 287 may be stored within each of the policy information points (distributed ledger) 282 included within the network endpoint nodes. In other embodiments, the distributed ledger may store a link to a smart contract 287, which is stored within another location (e.g., within policy decision point instructions 286) of a network endpoint node. In yet other embodiments, the smart contract 287 may simply be stored within computer readable storage device 280, or within NV memory 260, without being included within the distributed ledger. Regardless of where the smart contract is stored, each network endpoint node may contain an identical copy of the smart contract used to grant/deny/restrict access to the internal network.

A consensus algorithm 288 contains program instructions (or computer program code), which may be executed by a processing device (e.g., host processor 210 or EC 270) of IHS 200, to enable the network endpoint nodes to select a policy decision point leader and agree upon network access decisions. Examples of consensus algorithms include, but are not limited to, Proof of Work (PoW), Proof of Elapsed Time (POET), Proof of Stake (PoS), delegated PoS, Proof of Authority (PoA) and Proof of Importance (PoI).

In the example embodiment shown in FIG. 7, policy decision point instructions 286 represent a blockchain OS-application, which is stored within computer readable storage device 280 and executed by a processing device of IHS 200. Examples of suitable blockchain OS applications include, but are not limited to, Intel's Sawtooth application, in addition to open source applications, such as Ethereum and Hyperledger Fabric. It is noted that IHS 200 is not strictly limited to OS-based blockchain applications. In some embodiments, the policy decision point instructions 286 shown in FIG. 7 may not be stored within computer readable storage device 280, and IHS 200 may instead utilize a cloud-based Blockchain-as-a-Service (BaaS) platform to execute smart contracts, run consensus algorithms, and update the distributed ledger. Examples of BaaS platforms suitable for use by policy decision points 30 include, but are not limited to, Microsoft Blockchain on Azure, IBM Blockchain services, Amazon's Blockchain on AWS, etc.

Trusted Platform Module (TPM) 290 is a tamper-resistant integrated circuit or microcontroller that can perform cryptographic functions (including key generation) and protect small amounts of sensitive information, such as passwords and cryptographic keys. TPM 290 establishes a strong root of trust for the IHS. As known in the art, TPM 290 may generally include a plurality of Platform Configuration Registers (PCRs), which are used to store measurements created during the boot process, an encryption engine used to hash large blocks of data, and one or more key generation engines and a random number generator to generate keys that can be used for attestation purposes. For example, TPM 290 may generate an Attestation Identity Key (AIK) to attest to the validity of the platform's identity and configuration, an Endorsement Key (EK) to verify the authenticity of the TPM, and one or more Key Exchange Keys (KEKs) to attest the authenticity of various components, such as the boot loader.

At each system boot, TPM 290 performs a cryptographic hash of configuration settings, which are stored within the PCRs of the TPM in a tamper-resistant way. As noted above, for example, BIOS settings are hashed during each system boot and stored in TPM PCR1. In some embodiments, a TPM PCR1 measurement (retrieved by reading the PCR directly) or a TPM PCR1 quote (i.e., a signed version of that same value) may be stored in the distributed ledger. TPM 290 may also be used to attest to the client information provided by a client device requesting network access. For example, TPM 290 may perform platform attestation (i.e., provide proof of a set of the platform's integrity measurements) by digitally signing a set of PCRs using an AIK. In addition, TPM 290 may be used to attest to some specific data known by the TPM (e.g., client information 283) by digitally signing the data using an AIK.

NIC 300 enables IHS 200 to communicate with an external network 302 using any known communication protocol. Network 302 may be a local area network (LAN), wide area network (WAN), personal area network (PAN), or the like, and the connection to and/or between IHS 200 and network 302 may be wired, wireless or a combination thereof. For purposes of this discussion, network 302 is indicated as a single collective component for simplicity. However, it is appreciated that network 302 may comprise one or more direct connections to other remote systems, as well as a more complex set of interconnections as can exist within a wide area network, such as the Internet. In some embodiments, network 302 may represent the internal LAN 50 or WAN 90 shown in FIGS. 2, 4 and 5, or the mesh network shown in FIG. 6.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. A method to control network access, the method comprising:
   receiving a network access request from a client device to access a network, wherein the network comprises a plurality of network endpoint nodes;
   executing a smart contract upon receiving the network access request from the client device; to determine if the client device should be granted access to the network, wherein the smart contract includes a set of predefined rules defining: (a) network access behaviors of client devices that attempt to access the network, and (b) actions to be taken when one or more of the network access behaviors are observed, wherein the actions to be taken include granting access to the network, granting restricted access to the network and denying access to the network;
   executing a consensus algorithm upon receiving the network access request from the client device to select one of the network endpoint nodes to be a policy decision point leader; and
   controlling access to the network, wherein said controlling access to the network comprises generating and sending an acceptance response to the client device granting access to the network if the client device contains a client policy that satisfies one or more of the predefined rules of the smart contract;
   wherein said receiving a network access request, said executing a smart contract and said executing a consensus algorithm are performed by each of the plurality of network endpoint nodes; and
   wherein said generating and sending an acceptance response is performed only by the policy decision point leader.

2. The method recited in claim 1, further comprising:
   updating a network access log to include a log of the network access request received from the client device and the acceptance response sent to the client device by the policy decision point leader.

3. The method recited in claim 1, wherein said controlling access to the network further comprises:
   generating and sending a denial response to the client device denying access to the network if the client device contains a client policy that does not satisfy the one or more predefined rules of the smart contract; and
   wherein said generating and sending a denial response is performed only by the policy decision point leader.

4. The method recited in claim 3, further comprising:
   updating a network access log to include a log of the network access request received from the client device and the denial response sent to the client device by the policy decision point leader.

5. The method recited in claim 1, wherein prior to said generating and sending an acceptance response to the client device, the method further comprises:
   receiving client information from the client device; and
   attesting to the client information received from the client device; and
   wherein the acceptance response is generated and sent to the client device only if the client information is verified during said attesting.

6. The method recited in claim 5, wherein said attesting is performed by each of the plurality of network endpoint nodes via execution of the smart contract.

7. The method recited in claim 5, wherein said attesting comprises:
   comparing one or more Trusted Platform Module (TPM) Platform Configuration Register (PCR) values included within the client information to one or more desired TPM PCR measurements, which are stored within the smart contract; and
   verifying the client information if the one or more TPM PCR values included within the client information match the one or more desired TPM PCR measurements.

8. The method recited in claim 5, wherein said attesting comprises:
   requesting a Trusted Platform Module (TPM) of the client device to send a TPM quote; and
   verifying the client information if the TPM quote is received.

9. The method recited in claim 5, wherein said attesting comprises:
   using a public key provided by a Trusted Platform Module (TPM) of the client device to decrypt encrypted data included within the client information; and
   verifying the client information if the encrypted data is successfully decrypted with the public key.

10. The method recited in claim 5, further comprising generating and sending a denial response to the client device if the client device contains a client policy that does not satisfy the one or more predefined rules of the smart contract or the client information is not verified during said attesting.

11. A network access control system, comprising:
a plurality of network endpoint nodes included within a network, wherein each network endpoint node includes a policy information point and a policy decision point;
wherein the policy information point within each network endpoint node stores:
a distributed ledger including one or more client policies that must be satisfied to access the network, wherein the one or more client policies define system configurations, conditions and/or data that indicate a given client device is safe to access the network; and
a smart contract including a set of predefined rules defining: (a) network access behaviors of client devices that attempt to access the network, and (b) actions to be taken when one or more of the network access behaviors are observed, wherein the actions to be taken include granting access to the network, granting restricted access to the network and denying access to the network; and
wherein upon receiving a network access request from a client device outside of the network, the policy decision point within each network endpoint node is configured to execute:
the smart contract to determine whether the client device should be granted access, denied access or have restricted access to the network; and
a consensus algorithm to select one of the network endpoint nodes to be a policy decision point leader.

12. The network access control system as recited in claim 11, wherein the policy decision point leader is configured to:
send an acceptance response to the client device and generate a session token to allow the client device to access the network, if the client device contains a client policy that satisfies one or more of the predefined rules of the smart contract; and
send a denial response to the client device denying access the network, if the client device does not contain a client policy that satisfies one or more of the predefined rules of the smart contract.

13. The network access control system as recited in claim 12, wherein the distributed ledger further comprises a network access log, and wherein the network access request received from the client device and the acceptance response or the denial response sent to the client device by the policy decision point leader are added to the network access log.

14. The network access control system as recited in claim 11, wherein the policy decision point within each network endpoint node is coupled to receive client information from the client device, and configured to execute the smart contract to attest to the client information.

15. The network access control system recited in claim 14, wherein the policy decision point within each network endpoint node is configured to attest to the client information by:

comparing one or more Trusted Platform Module (TPM) Platform Configuration Register (PCR) values included within the client information to one or more desired TPM PCR measurements, which are stored within the smart contract; and
verifying the client information if the one or more TPM PCR values included within the client information match the one or more desired TPM PCR measurements.

16. The network access control system recited in claim 14, wherein the policy decision point within each network endpoint node is configured to attest to the client information by:
requesting a Trusted Platform Module (TPM) of the client device to send a TPM quote; and
verifying the client information if the TPM quote is received.

17. The network access control system recited in claim 14, wherein the policy decision point within each network endpoint node is configured to attest to the client information by:
using a public key provided by a Trusted Platform Module (TPM) of the client device to decrypt encrypted data included within the client information; and
verifying the client information if the encrypted data is successfully decrypted with the public key.

18. The network access control system recited in claim 14, wherein the policy decision point leader is configured to:
send an acceptance response to the client device and generate a session token to allow the client device to access the network, if the client device contains the client policy that satisfies the one or more predefined rules of the smart contract and the client information is verified during said attestation; and
send a denial response to the client device denying access to the network, if the client device does not contain a client policy that satisfies the one or more predefined rules of the smart contract or the client information is not verified during said attestation.

19. The network access control system as recited in claim 18, wherein the distributed ledger stored within each policy information point further comprises a network access log that includes a list of network access requests received from client devices attempting to access the network, and a decision made by the policy decision point leader to grant, deny or restrict network access.

20. The network access control system recited in claim 19, wherein the policy decision point leader is further configured to:
update the network access log stored within the distributed ledger to include a log of the network access request received from the client device and the acceptance response or denial response subsequently generated by the policy decision point leader.

* * * * *